US007834878B2

(12) United States Patent
Fischer

(10) Patent No.: US 7,834,878 B2
(45) Date of Patent: *Nov. 16, 2010

(54) METHOD OF DISPLAYING PRODUCT AND SERVICE PERFORMANCE DATA

(76) Inventor: John G. Fischer, 1100 Stone Gate Dr., Irving, TX (US) 75063-4676

( * ) Notice: Subject to any disclaimer, the term of this patent is extended or adjusted under 35 U.S.C. 154(b) by 0 days.

This patent is subject to a terminal disclaimer.

(21) Appl. No.: 12/360,436

(22) Filed: Jan. 27, 2009

(65) Prior Publication Data

US 2009/0213124 A1    Aug. 27, 2009

Related U.S. Application Data

(63) Continuation of application No. 10/758,660, filed on Jan. 15, 2004, now Pat. No. 7,483,026.

(60) Provisional application No. 60/441,101, filed on Jan. 17, 2003.

(51) Int. Cl.
G09G 5/36 (2006.01)
(52) U.S. Cl. ........................ 345/473; 345/629
(58) Field of Classification Search .............. 345/629, 345/473
See application file for complete search history.

(56) References Cited

U.S. PATENT DOCUMENTS

| | | | |
|---|---|---|---|
| 4,639,877 A | 1/1987 | Raymond et al. |
| 5,721,832 A | 2/1998 | Westrope et al. |
| 5,897,622 A | 4/1999 | Blinn et al. |
| 5,918,217 A | 6/1999 | Maggioncalda et al. |
| 5,970,471 A | 10/1999 | Hill |
| 6,085,185 A | 7/2000 | Matsuzawa et al. |
| 6,191,799 B1 | 2/2001 | Purdy |
| 6,236,980 B1 | 5/2001 | Reese |
| 6,243,076 B1 | 6/2001 | Hatfield |
| 6,285,380 B1 | 9/2001 | Perlin et al. |
| 6,300,959 B1 | 10/2001 | Gabler et al. |
| 6,319,121 B1 | 11/2001 | Yamada et al. |
| 6,340,330 B1 | 1/2002 | Oishi et al. |
| 6,341,269 B1 | 1/2002 | Dulaney et al. |
| 6,352,432 B1 | 3/2002 | Tsai et al. |
| 6,354,940 B1 | 3/2002 | Itou et al. |
| 6,384,846 B1 | 5/2002 | Hiroi |

(Continued)

OTHER PUBLICATIONS

Spencer, M. et al.; Executing Multiple Pipelined Data Analysis Operations in the Grid; Proceedings of the 2002 ACM/IEEE conference on Supercomputing; Nov. 2002; pp. 1-18; Supercomputing '02 Publisher; IEEE Computer Society Press.

(Continued)

*Primary Examiner*—Javid A Amini
(74) *Attorney, Agent, or Firm*—John G. Fischer; Storm LLP

(57) ABSTRACT

An entertaining and informative method of displaying competitive product performance data is disclosed. The various embodiments include a method for displaying product performance data by use of animated contests between animated representatives of competing products. The contest results are relative to selected product test results. The relationship between the test results and the contest results is a mathematical approximation. Thus, a gross disparity in the displayed animated contest is indicative of a gross disparity in the performance of the products on the test. Likewise, a closely fought contest in the displayed animated contest is indicative of close performance of the products on the test.

35 Claims, 5 Drawing Sheets

U.S. PATENT DOCUMENTS

| | | |
|---|---|---|
| 6,417,855 B1 | 7/2002 | Yonts |
| 6,450,889 B1 | 9/2002 | Mendes, Jr. |
| 6,473,794 B1 | 10/2002 | Guheen et al. |
| 6,502,076 B1 | 12/2002 | Smith |
| 6,509,730 B1 | 1/2003 | Afsah |
| 6,519,571 B1 | 2/2003 | Guheen et al. |
| 6,535,870 B1 | 3/2003 | Friske et al. |
| 6,536,037 B1 | 3/2003 | Guheen et al. |
| 6,601,233 B1 | 7/2003 | Underwood |
| 6,606,744 B1 | 8/2003 | Mikurak |
| 6,615,166 B1 | 9/2003 | Guheen et al. |
| 6,639,614 B1 | 10/2003 | Kosslyn et al. |
| 6,659,873 B1 | 12/2003 | Kitano et al. |
| 6,957,186 B1 | 10/2005 | Guheen et al. |
| 7,027,055 B2 | 4/2006 | Anderson et al. |
| 7,035,919 B1 | 4/2006 | Lee et al. |
| 7,107,238 B2 | 9/2006 | Hatakama et al. |
| 2001/0042037 A1 | 11/2001 | Kam et al. |
| 2002/0041284 A1 | 4/2002 | Konishi et al. |
| 2002/0138235 A1 | 9/2002 | Edwards et al. |
| 2003/0103070 A1 | 6/2003 | Tiongson et al. |

OTHER PUBLICATIONS

Li, Xuaoye S., et al.; Design, Implementation and Testing of Extended and Mixed Precision BLAS; ACM Transactions on Mathematical Software (TOMS); Jun. 2002; pp. 152-205; vol. 28; Issue 2.

Savolainen, J., et al.; Volatility Analysis Framework for Product Lines; ACM SIGSOFT Software Engineering Notes; pp. 133-141; vol. 26; Issue 3.

Mostafa, J., et al.; A Multilevel Approach to Intelligent Information Filtering: Model, System, and Evaluation; ACM Transactions on Information Systems; Oct. 1997; pp. 368-399; vol. 15; No. 4.

METHOD OF DISPLAYING PRODUCT AND SERVICE PERFORMANCE DATA

RELATED ART

This application claims priority to U.S. Provisional Patent Application No. 60/441,101 and U.S. patent application Ser. No. 10/758,660, now U.S. Pat. No. 7,483,026 issued Jan. 27, 2009.

FIELD OF INVENTION

The present invention relates to the area of data display formats and more particularly to the area of product and service testing and display of performance data. Still more particularly, the present invention relates to display of competitive product and service performance data and physical properties or characteristics using normalized data and graphical animation to display data such as test results, cost, and physical properties in an entertaining and informative manner.

BACKGROUND OF THE INVENTION

Testing and comparing products and services is an important social function that has been performed most exceptionally by consumer protection groups, and most notably by Consumer Union of U.S., Inc. (101v Truman Avenue, Yonkers, N.Y.) which publishes Consumer Reports® and The Buying Guide®. These publications have historically displayed the overall results of scientific testing of products in the form of horizontal histograms having an "Overall Score" with scale increments of "P" for "Poor," "F" for "Fair," "G" for "Good," "VG" for "Very Good," and "E" for "Excellent." This rating is based on a relative measurement to some standard established by Consumer Union. The standard is not immediately obvious, since the best product is not always rated as excellent, and the worst product is not always rated as poor.

In addition to the overall results displayed in histograms, Consumer Reports® and The Buying Guide®, the results of specific categorical tests are displayed in the form of shaded circles. A circle having horizontal bars covering the entire area of the circle represents "Excellent" performance. A circle having one-half of its surface covered by horizontal bars represents "Very Good" performance. A clear circle represents "Good" performance. A circle having one-half of its surface blackened represents "Fair" performance. A circle that is entirely blackened represents "Poor" performance.

While the above-described means of displaying performance are adequate for printed media, they are not very entertaining when viewed in an electronic format. They fail to take advantage of available technology that has been used to make other forms of education entertaining. Offering entertaining forms of education has been shown to benefit the students by making them interested in learning, and improving their ability to retain the information learned.

Commercials that make televised comparisons of products are well known and have been around for years. For example, taste testing of carbonated beverages such as Coca-Cola® and Pepsi® show actors selecting the sponsors' beverage in a blind taste test. These commercials fail to show the actors selecting the non-sponsored beverage, which nearly half of them do, and thus the commercial fails to communicate the statistical reality of the results of the testing. The commercials attempt to display the actual test, but not necessarily any display of the statistical results of multiple trials.

Other commercials have shown actors wiping up spills with a paper towel in which the paper towel self-destructs on contact with the spill. When the sponsor's paper towel is used it absorbs the spill and still looks new. These commercials also attempt to display the actual test, without data acquisition, normalization, or alternative display of the results.

Other commercials utilize a format that is designed to suggest some level of scientific comparison of products. The most famous of these was perhaps the one in which a gasoline had an additive that was proclaimed to substantially reduce pollution. A car was shown with a large plastic bag attached to the exhaust pipe filling up with black smoke, while men in lab coats with clipboards walked around taking notes. The same car was then filled with the sponsor's gasoline and the bag attached to the exhaust pipe appeared to be full of fresh air. It was later discovered that the first bag was made of a colored plastic. Besides misrepresenting the facts, this commercial failed to show a true relative performance of competing products that were scientifically tested, and instead suggested portrayal of an end result.

SUMMARY OF THE INVENTION

The present invention overcomes the disadvantages of the prior art and introduces a new concept, which integrates the principals of edutainment into one of infotainment. A primary advantage of the present invention is that it applies, in all respects, to testing of either products or services, and for the purpose of disclosure of the various embodiments of the present invention, all references to testing of products included herein are intended and understood to apply to a method of displaying service performance data as well, and are not intended or understood to be limited to a method of displaying the performance data of products.

Another advantage of the present invention is that it discloses a method of displaying the results of performance testing of products in a manner that is entertaining. Another advantage of the present invention is that it discloses a method of displaying the results of performance testing of products in a manner that is numerically relevant to the results of the test. Another advantage of the present invention is that it discloses a method of displaying the results of performance testing of products in a manner that is unrelated to the nature of the products tested. Another advantage of the present invention is that it discloses a method of displaying the results of performance testing of products in a manner that is unrelated to the nature of the test performed. Another advantage of the present invention is that it permits modification of the display of the results to the logo or company colors of the manufacturer of the product. Another advantage of the present invention is that it discloses a method of displaying the results of performance testing of products in a video or graphically animated manner.

Another advantage of the present invention is that it discloses a method of displaying the same results of a performance test of two or more products in multiple formats. Another advantage of the present invention is that it discloses a method of interactive comparison of selectable products and selectable tests. Another advantage of the present invention is that it discloses a method of displaying the results of a performance test of multiple products. Another advantage of the present invention is that it discloses a method of displaying the results of multiple tests that can include products that are tested at a later date. Another advantage of the present invention is that it discloses a method of displaying comparisons of product characteristics other than performance in a graphically animated manner.

Other advantages of the present invention will become apparent from the following descriptions, taken in connection with the accompanying drawings, wherein, by way of illustration and example, an embodiment of the present invention is disclosed.

In one embodiment of the present invention, a method of displaying product data is disclosed comprising the general steps of:
1. Determining a first product value representing a first product's test performance;
2. Determining a second product value representing a second product's test performance;
3. Solving for a contest value between the first product value and the second product value; and,
4. Selecting an animation file to be displayed, using the contest value.

An alternative embodiment includes the above steps with the additional step of:
5. Publishing the animation file on a web page for viewing by Internet users.

BRIEF DESCRIPTION OF THE DRAWINGS

The objects and features of the invention will become more readily understood from the following detailed description and appended claims when read in conjunction with the drawings and tables.

The drawings and tables constitute a part of this specification and include exemplary embodiments to the invention, which may be embodied in various forms. It is to be understood that in some instances various aspects of the invention may be shown by data or drawing exaggerated or enlarged to facilitate an understanding of the invention.

TABLE 1 is a table of calculated contest value ranges and corresponding graphic files.

TABLE 2 discloses an array relationship between subjective test results and corresponding graphic files.

TABLE 3 discloses an array relationship between product test results, calculated contest values, and indication of the best performing product.

TABLE 4 discloses an array relationship between a number of graphic files to choose from and calculated contest values where the number of graphic file choices exceeds the potential contest results.

TABLE 5 discloses an array relationship between calculated contest values and combat sequences, whereas the length of the battle depicts the closeness of the battle.

TABLE 6 discloses example data for previously determined product values for three products.

TABLE 7 discloses example data for newly determined product values for two additional products for the same test as the data in TABLE 6.

Figure 1:
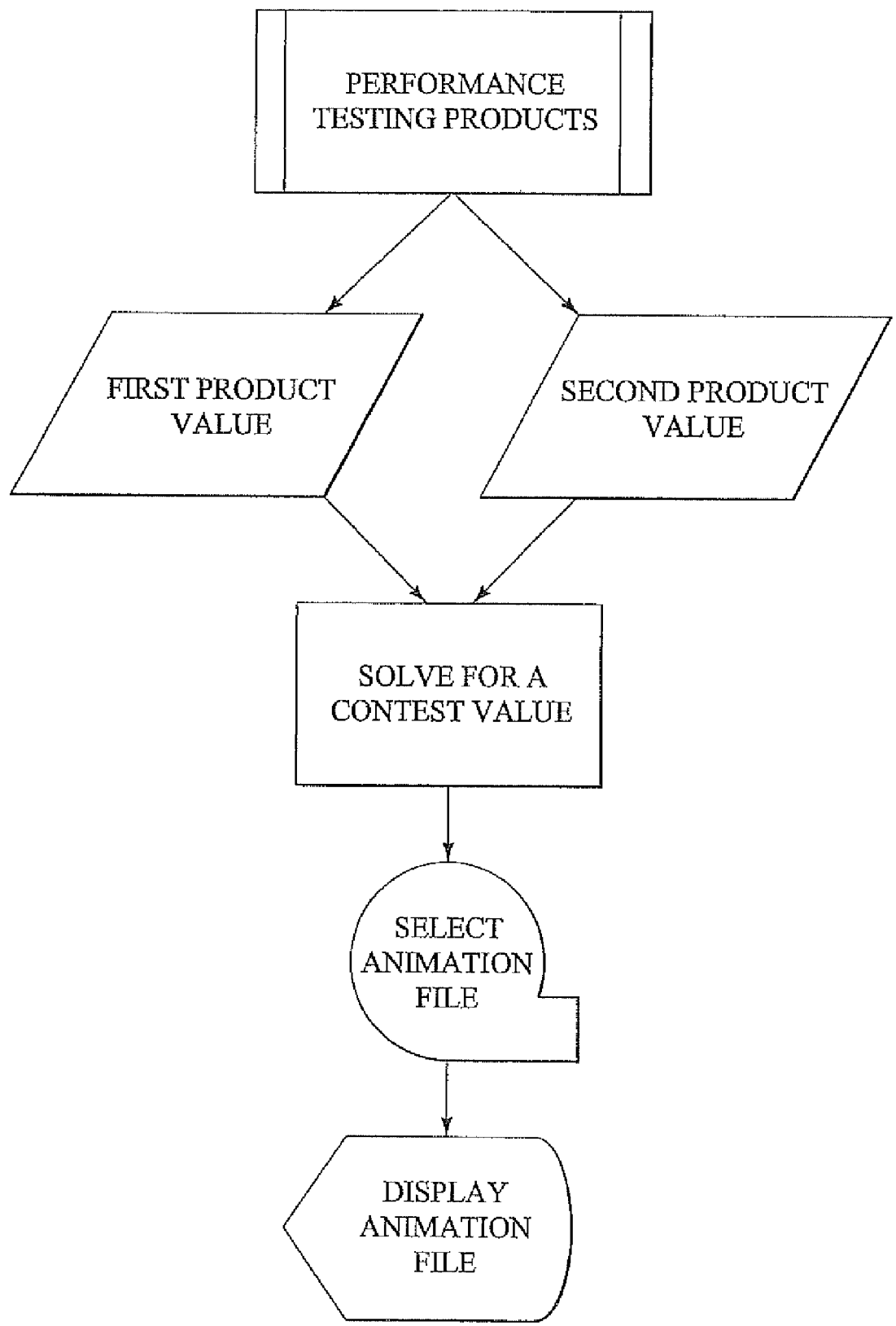

FIG. 1 is a diagram disclosing the steps of a preferred embodiment of the present invention.

Figure 2:
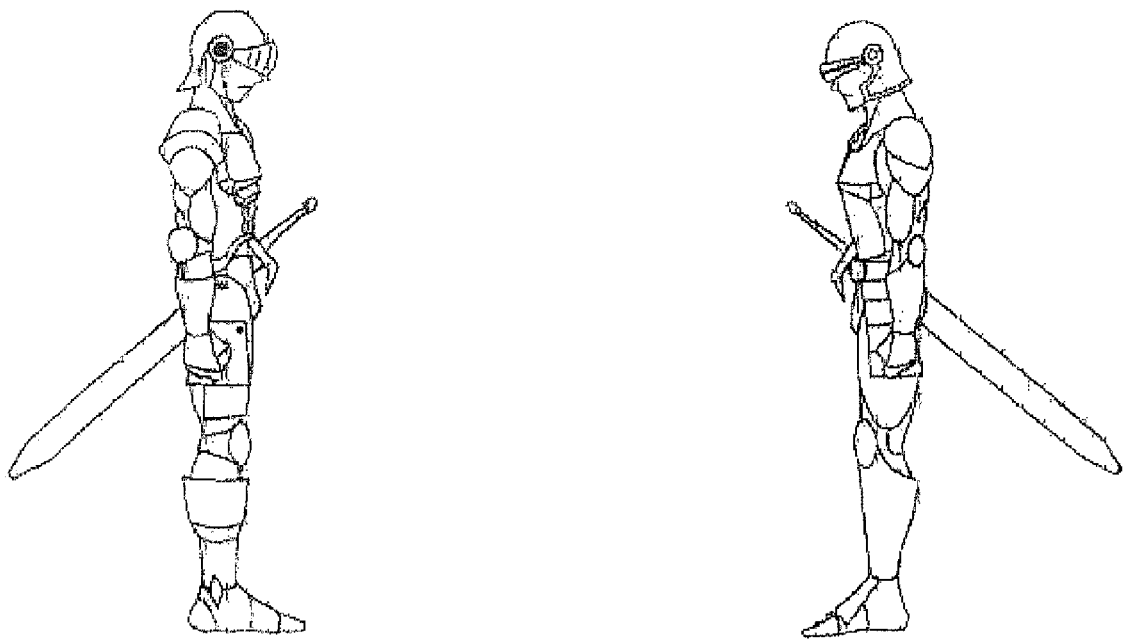

FIG. 2 is an example of a graphical image display of the animated representatives of the type that might be used to represent two products whose test performance data was to be compared. The diagram represents the beginning of a combat sequence.

Figure 3:
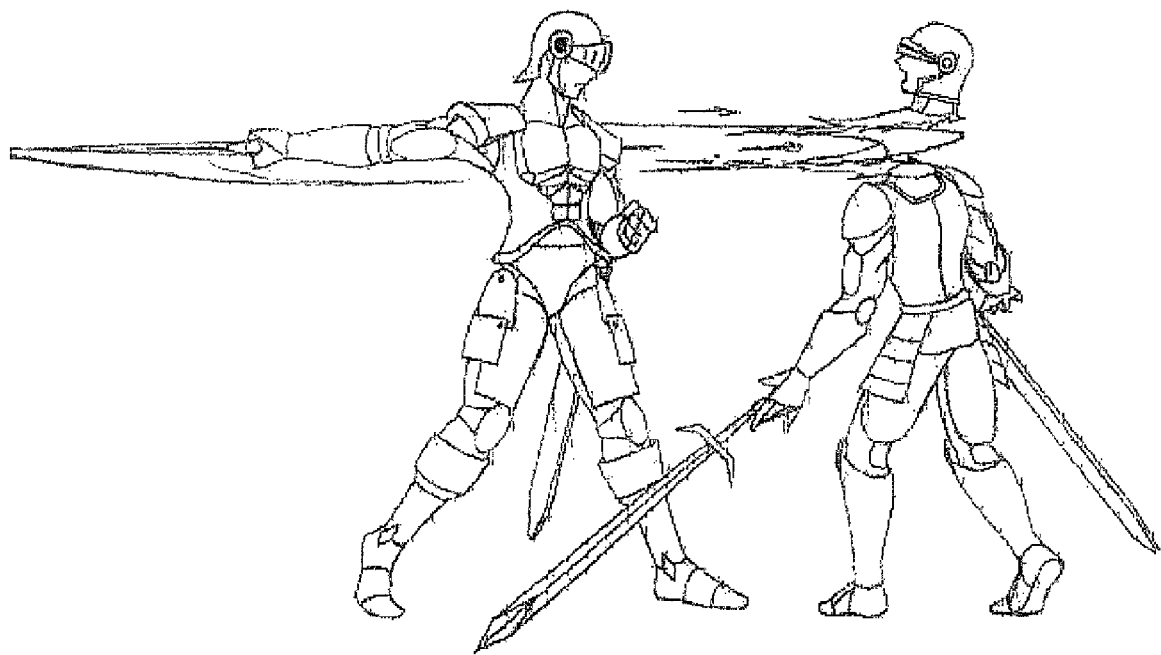

FIG. 3 is an example of a later in time graphical image display of the same combat sequence shown in FIG. 2. In this display, the animated representative on the left represents the product that had the superior performance on the test.

Figure 4:

FIG. 4 is an example of a still later in time graphical image display of the same combat sequence shown in FIG. 3. In this display, the animated representative on the left again represents the product that had the superior performance on the test.

Figure 5:
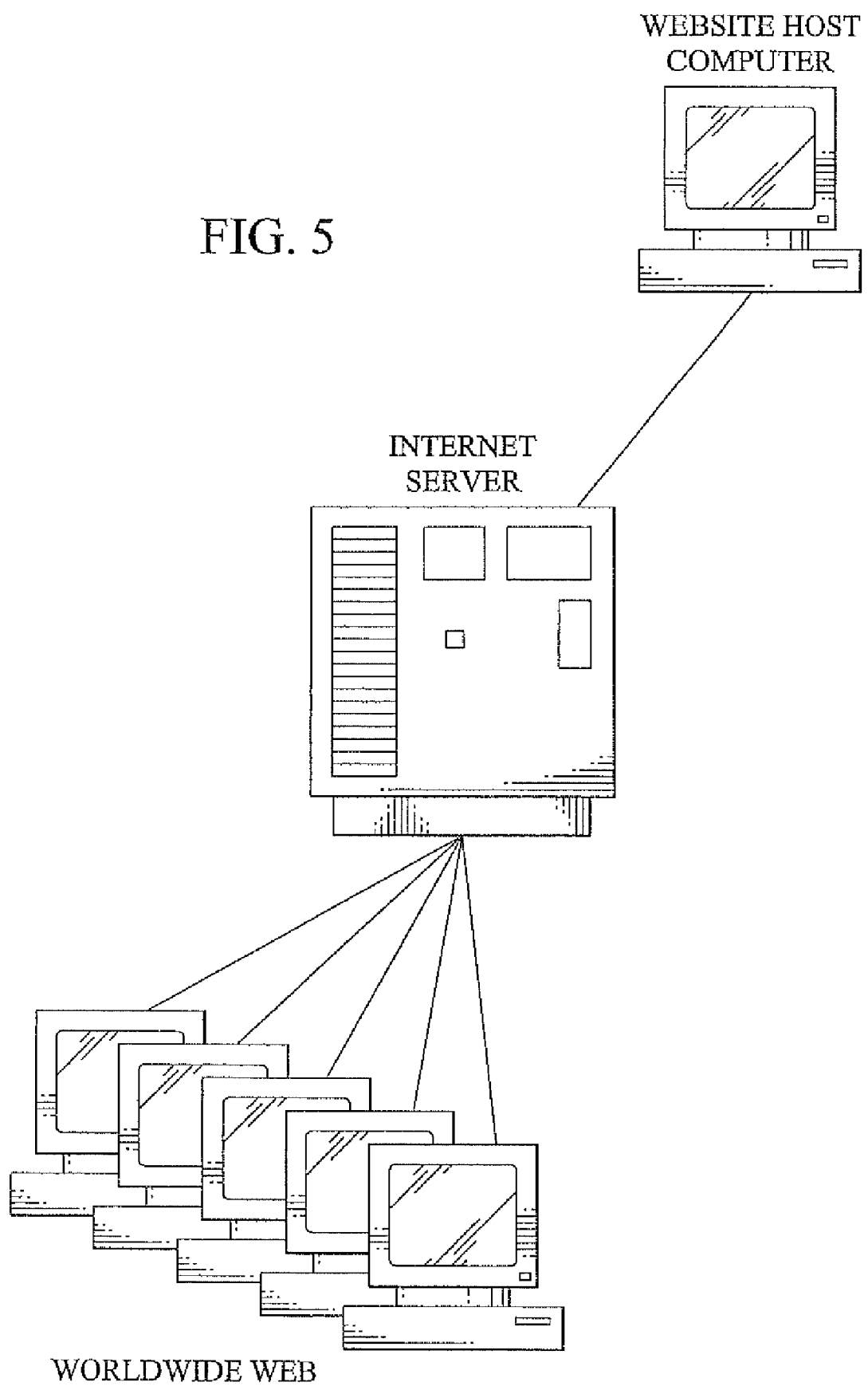

FIG. 5 is a diagram of a preferred embodiment of the invention demonstrating a means for displaying a selected animation file representing the contest results on the Internet.

DETAILED DESCRIPTION OF THE PREFERRED EMBODIMENTS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In one embodiment of the present invention, a method of displaying product data is disclosed comprising the general steps of:
1. Determining a first product value representing a first product's performance on at least one test;
2. Determining a second product value representing a second product's performance on the same test(s);
3. Solving for a contest value between the first product value and the second product value;
4. Selecting an animated contest file by relationship to the contest value; and,
5. Providing a display means for displaying the animated contest.

FIG. 1 is a simplified diagrammatic representation of these steps.

In the first step of this embodiment, a first product value representing a first product's performance on a test is determined. The product value can be a singular result, or a statistical numerical representation of a number of trials. For all purposes throughout this document, it is understood that a "test" can be, but is not limited to, a chemical, electrical, mechanical, or other measurement, observation or evaluation of the performance or physical properties or characteristics of a product, either subjective or objective.

In the second step of this embodiment, a second product value representing a second product's performance on the same test is determined. The unit of measure used is irrelevant, since the same test will be used to measure the first and second products' performance. Again, the product value can be a singular result, or a statistical numerical representation of a number of trials.

In the third step of this embodiment, a contest value is determined between the first product value and the second product value. A simple method for achieving this step is achieved by dividing the lower product value by the higher product value. The contest value is then a number less than 1, unless the results are equal. If the results are equal, the contest value will equal 1. In this manner, the contest value represents a performance ratio, or percentage of equality in performance between the first product and the second product for the test or tests represented by the product values for the products. If a larger product value represents better product performance on the tests, then the larger of the first product value and the second product value is the best result. If a smaller product value represents better product performance on the tests, then the smaller of the first product value and the second product value is the best result.

For example, if the first product value is 23 units, and the second product value is 33 units, then the contest value would be 23÷32=0.719 or approximately 72%. If a larger product value represents better product performance on the tests, then the first product value in this example is said to be only 72% as good as the second product value. If a smaller product value represents better product performance on the tests, then the second product value in this example is said to be only 72% as good as the first product value.

In the fourth step of this embodiment, the contest value is used to select a representative animation file to be displayed. The animation file can be an animated graphic file, a video file, or other. In a preferred embodiment, a database is provided with a number "n" for animated graphic files that depict different combat or athletic competition sequences between animated characters. A principal difference between the animated sequences is the closeness of the contest. In the case of combat sequences, for example, increasingly higher contest values are thus associated with increasingly close combat, with the highest contest value (one) associated with a combative impasse. Each graphic file may thus be associated with a range of contest values. The size of the contest value range "r" is inversely related to the number of graphic files available for selection. For example, where ten different graphic files are available:

n=animation files
r=range
r=1/n
  n=10
  r=0.10

Table 1 is a table example of an array relationship between contest values and associated graphic files, where n=10, and r=0.10.

TABLE 1

| Contest Value | Graphic File | Animation |
|---|---|---|
| 0.0-.1 | A | Very lopsided contest |
| >.1-.2 | B | |
| >.2-.3 | C | |
| >.3-.4 | D | |
| >.4-.5 | E | Increasingly close contest |
| >.5-.6 | F | |
| >.6-.7 | G | |
| >.7-.8 | H | |
| >.8-.9 | I | Very close contest |
| >.9-1.0 | J | Impasse |

As shown in Table 1, the contest value can be represented by a numerical range for the purpose of selection of a graphic file for display. In the above example, graphic file H would be selected, since the contest value of 0.72 is within the contest value range of (>0.7-0.8). In this embodiment, the contest value is determined on the basis of a mathematical relationship between the first product value and the second product value, and subsequent selection of a graphic file encompasses a range of contest values. In the above example, the number of possible contest results is infinite, and the number of animated graphic files is limited. As such, each graphic animation represents a range of contest values. For example, in Table 1, the same combat sequence would be displayed when the contest value was 0.79. When more graphic files are available to the array (n is greater), the range of the display representation is reduced (1/n is smaller), thus increasing the accuracy by which the animation or video represents the contest value.

Since it is always known by the nature of the test which of a larger or smaller product value represents better product performance on a test, this information is used to identify prevailing character in the animation file. Thus, graphic file H depicts a combat sequence or athletic competition between animated characters in which the better performing product defeats the lower performing product in a contest that is closer than the contest sequence depicted by graphic file G.

It will be understood and well-known by anyone skilled in the art that there are numerous equivalent methods for associating the contest value to a representative graphic file, many of them statistically more complex. Nothing in any of these examples are intended to limit the scope of the claims, but are provided instead solely for the enabling purpose of illustrating the principals of the invention.

In an alternative embodiment, the contest value is rounded to a selected number of significant digits related to the number of graphic files available. Thus, the rounded contest value will always be associated with a graphic file. This is appropriate, since associating a range of contest values to one graphic file represents a rounding step whenever the range (inverse of the number of groups) is greater than the uncertainty of the test results. As an example of this embodiment:

Where the number of graphic files available is 10.
n=animation files
r=range
CV=contest value
s=significant digits in contest value result
$CV_s$=contest value rounded to s significant digits
  n=10
  r=0.1
  s=1
  CV=0.547789
  $CV_s$=0.5

In another alternative embodiment, the number of available animation files exceeds the number of potential contest values. In this embodiment, the test may have a greater uncertainty than the value of the available ranges, since the graphic file selection will be made from less than all of the available graphic files. For example: if the test result requires a subjective (visual) determination of the resistance to oxidation on iron chips after exposure to a metalworking fluid, the possible results may be those found in Table 2.

TABLE 2

| Subjective Result Visible Oxidation | Product Test Value |
|---|---|
| None | 1 |
| Light | 2 |
| Medium | 3 |
| Heavy | 4 |

In Table 2 above, a lower number represents a better result, since that would indicate that the product had inhibited the oxidation of the test specimen.

Table 3 below includes the product test results from the above example, the contest values and indication of the best performing, or prevailing product. As a very simple example of a method of determining the contest value and prevailing product, the following steps may be used:

01 PV1=Product Value 1
02 PV2=Product Value 2

03 CV=Contest Value
04 IF (PV1)=(PV2), CV=1.0
05 IF (PV1)>(PV2), CV=[(PV2)/(PV1)]
06 ELSE CV=[(PV1)/(PV2)]

TABLE 3

| Product Value 1 (PV1) | Product Value 2 (PV2) | PV1/PV2 | PV2/PV1 | PV1 = PV2 | Contest Value | Best Product |
|---|---|---|---|---|---|---|
| 1 | 1 |  |  | 1.00 | 1.00 | equal |
| 1 | 2 | 0.50 |  |  | 0.50 | P1 |
| 1 | 3 | 0.33 |  |  | 0.33 | P1 |
| 1 | 4 | 0.25 |  |  | 0.25 | P1 |
| 2 | 1 |  | 0.50 |  | 0.50 | P2 |
| 2 | 2 |  |  | 1.00 | 1.00 | equal |
| 2 | 3 | 0.67 |  |  | 0.67 | P1 |
| 2 | 4 | 0.50 |  |  | 0.50 | P1 |
| 3 | 1 |  | 0.33 |  | 0.33 | P2 |
| 3 | 2 |  | 0.67 |  | 0.67 | P2 |
| 3 | 3 |  |  | 1.00 | 1.00 | equal |
| 3 | 4 | 0.75 |  |  | 0.75 | P1 |
| 4 | 1 |  | 0.25 |  | 0.25 | P2 |
| 4 | 2 |  | 0.50 |  | 0.50 | P2 |
| 4 | 3 |  | 0.75 |  | 0.75 | P2 |
| 4 | 4 |  |  | 1.00 | 1.00 | equal |

From Table 3 above, it is seen that where two products are tested, with four possible test results, there are only six possible distinct contest values. If there are ten (10) graphic files to choose from, the number of animated graphic file choices exceeds the potential contest results. Table 4 discloses the six possible contest values for this example and the associated graphic files.

TABLE 4

| Contest Value | Range | Graphic File |
|---|---|---|
|  | 0.0-.1 | A |
|  | >.1-.2 | B |
| .25 | >.2-.3 | C |
| .33 | >.3-.4 | D |
|  | >.4-.5 | E |
| .50 | >.5-.6 | F |
| .67 | >.6-.7 | G |
| .75 | >.7-.8 | H |
|  | >.8-.9 | I |
| 1.0 | >.9-1.0 | J |

In another preferred embodiment, the length of the animated contest is related to the closeness of the contest. Using the example of a combat sequence, the closeness of the battle can be depicted by the length of the battle. This is seen in Table 5 below.

TABLE 5

| Contest Value | Graphic File | Combat Time (seconds) |
|---|---|---|
| 0-.1 | A | 3 |
| >.1-.2 | B | 6 |
| >.2-.3 | C | 9 |
| >.3-.4 | D | 12 |
| >.4-.5 | E | 15 |
| >.5-.6 | F | 18 |
| >.6-.7 | G | 21 |
| >.7-.8 | H | 24 |
| >.8-.9 | I | 27 |
| >.9-1.0 | J | 30 |

In the example of this embodiment, combat time has an approximately linear relationship to the Contest Value defined by:

Combat Time=Contest Value(range upper limit)×30

In this example, the combat sequence (i.e., wrestling, boxing, sword fight, gun fight, etc.) for graphic file G is 21 seconds long, whereas the combat sequence for graphic file B lasts only 6 seconds. Likewise, graphic file G depicts a combat sequence that is less closely fought than the combat sequence depicted in the graphic file H. Preferably, graphic file J in the above example depicts a combat sequence that ends in a combative impasse. Using an athletic contest in this embodiment, such as a foot race, time can be used to distinguish between the finish time of the winner and loser.

In another preferred embodiment, the length of the animated contest is related to the brutality of the contest. This is preferably used in combination with the variable length of the combat sequence. In this embodiment, the graphic files comprise combat sequences that display increasing brutality as the contest value approaches zero. For example, if the contest value is as low as 0.1, the graphical representative of the superior performing product could move in quickly and behead a hapless competitor who is running for his life. In contrast, if the contest value is as high as 0.9, the graphic file would display a closely fought contest in which the winner only prevails near the very end of the time allotted for the match.

FIG. 2 discloses an example of the beginning of an animated graphical display of a product performance comparison represented by combat. FIG. 3 discloses an example of the progress of the match in which the animated representative on the left represents the product with the superior test results. FIG. 4 is an example of a still later in time graphical image display of the same combat sequence shown in FIG. 2 and FIG. 3. In this display, the animated representative on the left again represents the product that had the superior performance on the test.

FIG. 5 is a diagram of a preferred embodiment of the invention demonstrating a means for displaying an animation file selected to represent the contest results between products or services. In another embodiment, a monitor electrically connected to a computer constitutes a means for displaying the animation file selected to represent the contest result.

In another preferred embodiment, a legend is displayed identifying the products, manufacturers, services, or service providers. In a more preferred embodiment, the legend identifies the test. In a still more preferred embodiment, the animated characters have company logos or company colors superimposed on them to permit immediate recognition of the character during the contest.

In another preferred embodiment, a timing device is displayed to communicate the potential length of the contest, and the passing time of the current contest. In this manner, the viewer has a relative sense of the closeness of the product performances. This could also be displayed in a manner analogous to rounds in a prizefight. If a scheduled ten round fight results in a first round knock-out with the loser biting off the winner's ears, it is clear that there was a significant disparity in the performance of the products or services.

In another preferred embodiment, animated testing devices can be shown with the timing accelerated so that a test result that might have taken hours, days or weeks, can be simulated and accelerated, with the simulated display being mathematically related to the actual test results, as determined by the contest value.

In another preferred embodiment, a scoring device is displayed to communicate the actual relative mathematical result of the contest, such as the actual contest value.

In another preferred embodiment, a scoring device is displayed to communicate the progressive status of the contest. As with a timer, in this manner the viewer has a relative sense of the closeness of the product performances. This could be displayed as indicative elements such as hits, wounds, rate, distance, points, or other measures as are commonly known in the computer gaming industry.

In another preferred embodiment, a scoring device is displayed to communicate the actual test results, preferably in combination with the units of measure. In this manner the viewer has a relative sense of the closeness of the product performances. This could be displayed in a manner such as hits, wounds, rate, distance, points, or other measures as are commonly known in the computer gaming industry In another preferred embodiment, the animation files contain prerecorded video files of live sporting contests, as opposed to animated graphics.

In another preferred embodiment, the animated graphic file comprises a file whose displayable animation is determinable in part by the first product value. In this embodiment, the performance of a graphically animated character is based in part on at least one variable; for example, strength, skill, senses, speed, or weapons. In this embodiment, the first numerical test is used directly or indirectly to influence the variable.

In another preferred embodiment, the animated graphic file comprises a file whose displayable animation is determinable in part by the contest value. In this embodiment, the relative performance of at least two graphically animated characters is based in part on at least one variable; for example, strength, skill, or weapons. In this embodiment, the contest value is used directly or indirectly to influence the variable.

In another preferred embodiment, the uncertainty or calculated error of the test results is mathematically related to the contest value so as to allow the margin of error to depict a combat sequence that is more closely fought by the amount of the uncertainty or error. If the error is known to be 1 unit, the first product value is 22 units, and the second product value is 32 units, an example of a simplified method of calculating the contest value under this embodiment is:

$$\frac{[\text{first product value} + \text{test uncertainty}]}{[\text{second product value} - \text{test uncertainty}]} = \text{contest value}$$

$$[22+1] \div [32-1] = 0.77$$

If a larger product value represents better product performance on the tests, then the first product value in this example is said to be approximately 77% as good as the second product value. If a smaller product value represents better product performance on the tests, then the second product value in this example is said to be only 77% as good as the first product value.

In this example, graphic file H would be selected from Table 1. The use of this embodiment in this manner is seen to select a graphic or video file that narrows the disparity between the product test results by an amount equal to the error of the test. Without consideration of the error or uncertainty, graphic file G would have been selected. As is well-known and understood to one skilled in the art, there are numerous ways to account for the error or uncertainty in the test results. The foregoing example is intended to demonstrate the embodiment of the invention, and not otherwise limit the invention or scope of the claims in any way.

In another preferred embodiment, the product values of other product performances are used to produce an adjusted contest value, thus providing greater visual variation in the displayed result. Another advantage to this embodiment is that a single animated charter can be competitive against numerous competitors, or alone, against existing records. Table 6 is a table displaying previously determined product values for three products.

TABLE 6

| Trial | Product 1 | Product 2 | Product 3 |
| --- | --- | --- | --- |
| 1 | 42 | 52 | 31 |
| 2 | 41 | 52 | 32 |
| 3 | 41 | 51 | 32 |
| 4 | 43 | 53 | 32 |
| Average | 41.8 | 52.0 | 31.8 |

Table 7 represents newly determined product values for two additional products.

TABLE 7

| Trial | Product 4 | Product 5 |
| --- | --- | --- |
| 1 | 61 | 50 |
| 2 | 58 | 54 |
| 3 | 60 | 51 |
| 4 | 61 | 50 |
| Average | 60.0 | 51.3 |

In this example, the average of the test results over a number of trials is used to determine the product value for each product. The range of product values for the products is from 31.8 to 60, or 28.2 units. Alternatively, the high and low product values for a given trial may be used. In this embodiment, a product performance can be displayed for a product against all of the tested competition represented as a single action character, or as against any of the other tested products individually or together (such as in a multi-competitor race or free-for-all battle). An example of such a comparison is as follows:

Contest value=(Product value−Minimum Result)/Range

For Product 5 in the above example:

Contest value=(51.3−31.8)/(60−31.8)=0.69

In this example, the graphic file selected from Table 1 to represent the performance of Product 5 against the field of tested products would be G. In this embodiment, a combat sequence related to graphic file G, might display the representative graphical actor slaying 7 of 10 dragons. An athletic performance representation might show the representative graphical actor finishing third out of ten runners in a race (in front of six others). As will be well known to a person of ordinary skill in the art, more sophisticated statistical operations can be performed without departing from the scope of the disclosed embodiment. For example, standard deviation and variance calculations can be performed and used to discard data points, and to indicate the reliability of the results for a product or test.

In another preferred embodiment, the product values of other products are used to produce an ordered sequence of contest values. Graphic files are selected based on the ordered sequence.

In another embodiment, two products can be compared as before, using the statistical data of other product tests to display the relative product performances. For example:

Contest value=1−(|First product value−Second product value|/Range)

Comparing Product 5 and Product 1 from Tables 6 and 7 above;

Contest value=1−(|51.3−41.8|/28.2)=0.66

By this method, the graphic file selected from Table 1 to represent the contest between the products would be G.

It is thus seen that this embodiment enables continued testing to establish relative performance to a broader product spectrum, and also permits a more relevant outcome to be displayed.

In another embodiment, the product value representing a product's test performance is determined, and a statistical product value representing a multitude of other products' test results is determined. A contest value is solved between the first product value and the statistical product value.

In another preferred embodiment, the product values of other product performances are used to produce a nonlinear adjusted contest value, thus providing greater visual variation in the displayed result.

FIG. 2 discloses another preferred embodiment of the invention, in which the performance data of product or service tests are stored on a computer hosting a website, connected to a server. In this embodiment, the animated contest files selected to represent the contest values are also stored on the computer or on a computer in communication with another computer having the performance data of the product or service tests. Preferably, the files are stored on the Internet server provider's computers. The server provides access to the web site on which the contest is displayed. Thus, Internet users, visitors, viewers, or subscribers to the website, can see the animated contest between the products or services representing the result of performance test between the products or services.

While this invention has been described in connection with a preferred embodiment, it is not intended to limit the scope of the invention to the particular form set forth but, on the contrary, it is intended to cover such alternatives, modifications, and equivalents as may be included within the spirit and scope of the invention as defined by the appended claims.

I claim:

1. A method of displaying competitive product performance data, comprising:
   storing a plurality of animated graphic files onto a computer readable medium, each animated graphic file depicting a contest between at least a first entity representing a first product and a second entity representing a second product;
   providing a numeric interval comprising a substantially continuous numeric scale;
   dividing the numeric interval into a plurality of numeric ranges;
   associating a numeric range with an animated graphic file;
   storing a first product value representing a measurement of the first product's performance on a test onto the computer readable medium;
   storing a second product value representing a measurement of the second product's performance on the test onto the computer readable medium;
   solving for a numeric contest value by mathematical relationship between the first product value and the second product value;
   determining which numeric range includes the contest value; and
   identifying the animated graphic file associated with the numeric range which includes the contest value.

2. The method of displaying competitive product performance data in accordance with claim 1, wherein displaying the selected animated graphic file is a video file.

3. The method of displaying competitive product performance data in accordance with claim 1, wherein displaying the animated graphic file further comprises:
   providing a hyperlink for displaying the selected animated contest on a web page for viewing by Internet users.

4. The method of displaying competitive product performance data in accordance with claim 1, further comprising:
   the animated files comprise a physical contest between at least two animated adversaries.

5. The method of displaying competitive product performance data in accordance with claim 1, further comprising:
   the length of the animated graphic file to be displayed, is related to the contest value.

6. The method of displaying competitive product performance data in accordance with claim 1, further comprising:
   the brutality of the animated graphic file selected is related to the contest value.

7. The method of displaying competitive product performance data in accordance with claim 1, further comprising:
   providing a legend that may be displayed for identifying the products, manufactures, or test performed.

8. The method of displaying competitive product performance data in accordance with claim 4, further comprising:
   associating company logos with the animated adversaries for identifying the first product and the second product.

9. The method of displaying competitive product performance data in accordance with claim 4, further comprising:
   associating colors with the clothing of animated adversaries for identifying the first product and the second product.

10. The method of displaying competitive product performance data in accordance with claim 1, further comprising:
    providing a timer animation which displays the potential length of the contest.

11. The method of displaying competitive product performance data in accordance with claim 1, further comprising:
    providing a timer animation which displays the passing time of the contest.

12. The method of displaying competitive product performance data in accordance with claim 1, further comprising:
    providing a timer animation which displays a simulated time that is accelerated; and,
    the simulated time being mathematically related to the actual test results.

13. The method of displaying competitive product performance data in accordance with claim 1, further comprising:
    providing a displayable scoring device indicating the result of the contest.

14. The method of displaying competitive product performance data in accordance with claim 1, further comprising:
    providing a displayable scoring device indicating the progressive status of the contest.

15. The method of displaying competitive product performance data in accordance with claim 1, further comprising:
    providing a scoring device indicating the test result combined with a units of measure associated with the first and second product values.

16. The method displaying competitive product performance data in accordance with claim 1, wherein solving for a contest value between the first product value to the second product value further comprises dividing the first product value by the second product value.

17. The method of displaying competitive product performance data in accordance with claim 1, wherein determining a first product value representing a first product's performance result further comprises determining a statistical representation of the first product's performance for a plurality of measurements of the first product's performance on a test.

18. The method of displaying competitive product performance data in accordance with claim 1, wherein the first product value and the second product value are statistical representations of multiple test results of the first product and the second product.

19. The method of displaying competitive product performance data in accordance with claim 1, wherein determining a first product value and second product value further comprises:
   a) observing at least one qualitative test result; and,
   b) quantifying the results on a numerical scale.

20. The method of displaying competitive product performance data in accordance with claim 1, further comprising:
   providing a scaled database of animated graphic files which portray increasingly close contests when the contest value represents an increasingly close first product value and second product value.

21. The method of displaying competitive product performance data in accordance with claim 1, further comprising:
   graphically identifying an animated representative of the first product; and
   graphically identifying an animated representative of the second product.

22. The method of displaying competitive product performance data in accordance with claim 1, further comprising:
   determining the maximum contest value interval; and,
   dividing the absolute value of the maximum contest value interval by the number of associated animated graphic files to determine the numeric range of each animated graphic file.

23. The method of displaying competitive product performance data in accordance with claim 1, further comprising:
   determining the maximum contest value interval; and,
   dividing the absolute value of the contest value interval by the number of associated animated video files to determine the numeric range of each animated video file.

24. The method of displaying competitive product performance data in accordance with claim 1, further comprising:
   wherein the numeric range is inversely proportional to the number of associated animated graphic files.

25. The method of displaying competitive product performance data in accordance with claim 1, further comprising:
   determining which of the first and second product performances is superior;
   associating the prevailing character in the animated file with the superior performing product.

26. A method of displaying competitive product performance data, comprising:
   storing a plurality of animated video files onto a computer readable medium, each animated graphic file depicting a contest between at least a first entity representing a first product and a second entity representing a second product;
   determining a maximum contest value;
   determining a minimum contest value;
   defining a numeric interval comprising a substantially continuous numeric scale dividing the numeric interval into a plurality of numeric ranges;
   associating each numeric range with an animated graphic file;
   determining a first product value representing the first product's performance on a test;
   determining a second product value representing the second product's performance on the test;
   solving for a numeric contest value by mathematical relationship between the first product value and the second product value;
   determining which numeric range includes the contest value; and,
   identifying the animated graphic file associated with the numeric range which includes the contest value.

27. A method of displaying competitive product performance data, comprising:
   storing a plurality of animated video files onto a computer readable medium, each animated video file depicting a contest between at least a first entity representing a first product and a second entity representing a second product;
   providing a numeric interval comprising a substantially continuous numeric scale;
   dividing the numeric interval into a plurality of numeric ranges;
   associating each numeric range with an animated graphic file;
   determining a first product value representing the first product's performance on a test;
   determining a second product value representing the second product's performance on the test;
   solving for a numeric contest value by mathematical relationship between the first product value and the second product value;
   determining which numeric range includes the contest value; and,
   identifying the animated graphic file associated with the numeric range which includes the contest value.

28. A method of displaying competitive product performance data, comprising:
   storing a plurality of animated video files onto a computer readable medium, each animated video file depicting a unique contest between at least a first entity representing a first product and a second entity representing a second product;
   associating each animated video file with at least one unique numeric range that collectively comprise a substantially continuous numeric scale;
   determining a first product value representing a first product's performance on a test;
   determining a second product value representing a second product's performance on the test;
   adding the first product value to a database of other product values of other product performances on the test;
   adding the second product value to the database of other product values of other product performances on the test;
   determining a statistical numerical representation of the database;
   solving for a first product base value between the first product value and the statistical numerical representation;
   solving for a second product base value between the second product value and the statistical numerical representation;
   solving for a numeric contest value by mathematical relationship between the first product base value and the second product base value;

determining which numeric range includes the contest value; and, identifying the animated graphic file associated with the numeric range which includes the contest value.

29. A method of displaying competitive product performance data, comprising:

storing a plurality of animated graphic files onto a computer readable medium, each animated graphic file depicting a unique contest between at least a first entity representing a first product and a second entity representing a second product;

associating each animated graphic file with at least one unique numeric range that collectively comprise a substantially continuous numeric scale;

determining a first product value representing a first product's performance on a test;

determining a baseline product value statistically representing of a plurality of other product performances on the same test;

solving for a contest value between the first product value and the baseline product value;

determining which numeric range includes the contest value; and, identifying the animated graphic file associated with the numeric range which includes the contest value.

30. A method of displaying competitive product performance data, comprising:

storing a first product value representing a measurement of a first product's performance on a test on a computer readable medium;

storing a second product value representing a measurement of a second product's performance on the test on a computer readable medium;

solving for a numeric contest value by mathematical relationship between the first product value and the second product value;

providing an animation file on a computer readable medium, depicting a combative contest between at least a first entity representing the first product and a second entity representing the second product;

adjusting the performance of at least one entity by relationship to the contest value;

identifying the animated graphic file; and, whereas the display of the animated graphic file is thus influenced by contest value.

31. The method of displaying competitive product performance data in accordance with claim 30, wherein displaying the selected animated graphic file is a video file.

32. The method of displaying competitive product performance data in accordance with claim 30, wherein displaying the animated graphic file further comprises:

providing a hyperlink on a web page for displaying the selected animated contest for viewing by Internet users.

33. A method of displaying competitive product performance data, comprising:

storing a first product value representing a measurement of a first product's performance on a test on a computer readable medium;

storing a second product value representing a measurement of a second product's performance on the test on a computer readable medium;

solving for a numeric contest value by mathematical relationship between the first product value and the second product value;

providing an animation file on a computer readable medium, depicting a combative contest between at least a first entity representing the first product and a second entity representing the second product;

adjusting the performance of the first entity by relationship to the first product value;

identifying the animated graphic file; and, whereas the display of the animated graphic file is thus influenced by contest value.

34. The method of displaying competitive product performance data in accordance with claim 33, wherein displaying the selected animated graphic file is a video file.

35. The method of displaying competitive product performance data in accordance with claim 33 wherein displaying the animated graphic file further comprises:

providing a hyperlink on a web page for displaying the selected animated contest for viewing by Internet users.

* * * * *